Aug. 31, 1943.    V. FORGETT    2,328,067
ELECTRODE HOLDER
Filed Feb. 28, 1942
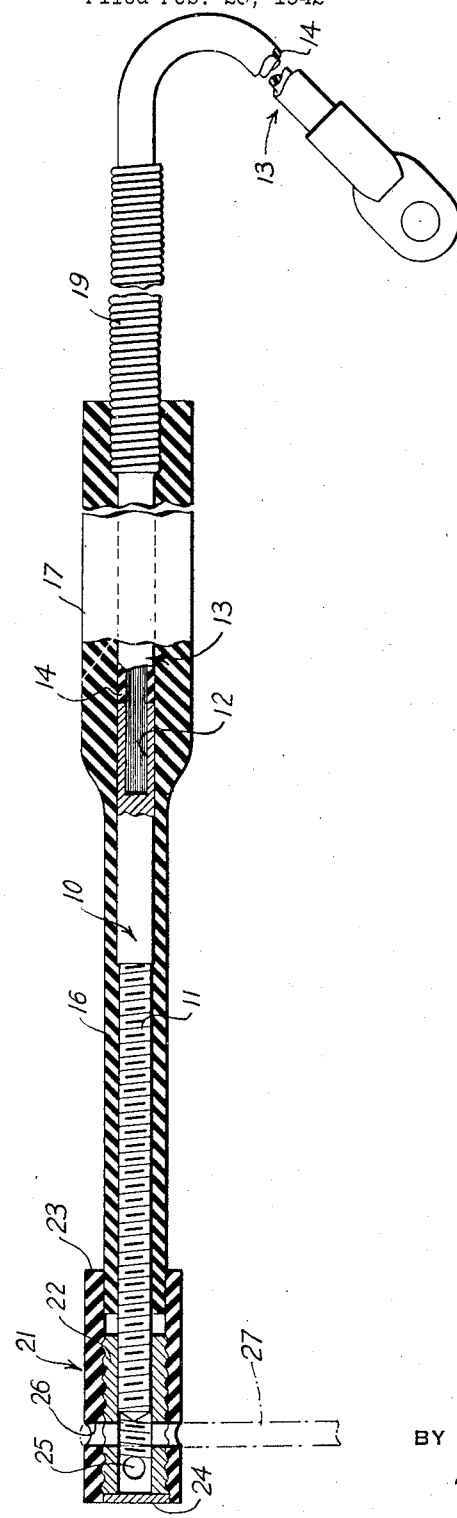
INVENTOR
VALMORE FORGETT
BY
*J. H. Vandenberg*
ATTORNEY Patented Aug. 31, 1943

2,328,067

UNITED STATES PATENT OFFICE 2,328,067

ELECTRODE HOLDER

Valmore Forgett, Teaneck, N. J., assignor to Air Reduction Company, Incorporated, New York, N. Y., a corporation of New York Application February 28, 1942, Serial No. 432,883

3 Claims. (Cl. 219—8)

This invention relates to electrode holders for arc welding.

It is an object of the invention to provide an improved, fully insulated, electrode holder that is suitable for welding in close quarters such as encountered on the complicated assemblies used in aircraft production. Complete insulation of the electrode holder is advantageous for such work because an arc may jump from an uninsulated stem to a tube, or other part, that is close to the stem and produce a scar or blemish that will result in a rejection of the assembly when it reaches the inspection department.

This invention includes a construction in which an electrode is clamped in the head of the holder by a stem that threads into the head. The insulation on the head overlaps the insulation on the stem, and the threads on the stem extend for considerable distance under the insulation on the stem so that whenever the end of the stem becomes mushroomed or otherwise damaged so that it does not readily screw into the head, the end of the stem can be cut off and new threads exposed by peeling back the insulation on the stem.

Another feature of the invention relates to a construction of the electrode holder with a molded insulation that is applied to the holder after the various parts, except the head, are in assembled relation. The molded insulation preferably holds a spring for keeping the lead cable from bending sharply at the end of the handle, and the lead cable is permanently attached to the electrode holder.

Other objects, features and advantages of the invention will appear or be pointed out as the specification proceeds.

The drawing is a side view, partly in elevation, but mostly in section, showing an electrode holder embodying the invention.

A body element comprising a metal stem 10, which is preferably steel or brass, has threads 11 for a considerable distance back from one end, and has a socket 12 in its other end for receiving the end of a lead cable 13 that is permanently secured in the socket 12, preferably by silver solder. Beyond the socket 12, the lead cable 13 is covered by insulation 14.

The stem 10 is covered with insulation 16 except for a short portion at one end of the stem. At the other end of the stem the insulation is of larger diameter and forms a handle 17.

The insulation may be a molded composition of Bakelite and asbestos flour. In the illustrated embodiment of the invention the insulation is removed from the end of the lead cable 13, the cable end inserted into the socket 12 and secured to the stem 10, and a coil spring 19 around the lead cable positioned as shown in the drawing before the insulation 16 is applied. With the parts in such assembled relation, the insulation 16 is molded on and the spring 19 is held in position by the insulation that forms the handle 17. The spring 19 prevents the lead cable from being bent sharply where it comes out of the handle 17.

A head 21 has an internally-threaded metal sleeve 22 that screws on the end of the stem 10. This sleeve is covered with insulation 23 that extends beyond the sleeve for a short distance at the forward end of the sleeve to form a socket that holds an insulation disk 24 which closes the open end at the front of the insulation 23.

The insulation 23 extends for some distance beyond the end of the sleeve 22 and over the insulation 16 of the stem 10. The inside diameter of the insulation 23 is slightly larger than the outside diameter of the insulation 16 on the stem.

There are openings 25 and 26 through the head 21 for receiving an electrode. These openings extend at right angles to one another and either may be used for the electrode. In the drawing, an electrode 27 is shown in dot and dash lines clamped against the side of the opening 26 by the end of the stem 10.

When the threads on the end of the stem 10 become damaged, or mutilated, the defective part of the stem 10 is cut off with a hacksaw, or by other means, and the insulation 16 is peeled off to expose sufficient threads to permit the stem 10 to be screwed into the head 21 far enough to clamp the electrode 27.

The lead cable 13 has a terminal 28 for connecting it with a source of welding current.

Changes and modifications can be made in the illustrated embodiment of the invention, and some features can be used without others.

I claim:

1. An electrode holder including a body element threaded at one end and having a recess at the other end, an insulated lead cable having a bare end portion permanently secured in the recess, a coil spring surrounding the insulation on the lead cable at a region back from the body element, a one-piece insulation jacket molded over the body element, the forward end portion of the spring, and the cable between the body element and the spring to hold said spring in assembled relation with the other parts, the molded insulation being of large diameter in the region of the spring and recess to serve as a handle, a head at the forward end of the body element with an opening for receiving a welding electrode, and insulation covering the head and overlapping the insulation on the body element to provide a fully-insulated electrode holder.

2. An arc welding electrode holder comprising a stem having a handle portion at one end and an electrode engaging and clamping portion at its other end, said stem being threaded for a substantial portion of its length inwardly from its electrode-engaging end, insulation covering said stem except for a limited portion of its length at its electrode-engaging end, a head threaded onto the exposed, threaded end of said stem, said head having a transverse opening adapted to receive an electrode, so that when an electrode is inserted therein and the head screwed onto the stem the end of the stem will engage and clamp the electrode in the head, and insulation covering said head, said stem being threaded for a substantialy portion of its length beneath its covering insulation, so that when the electrode-engaging end of the stem becomes mutilated as a result of its clamping action against an electrode it may be removed and the outer portion of the insulation removed from the stem to again present an exposed threaded portion of the stem of the length of the initial exposed, threaded portion.

3. A fully-insulated electrode holder for arc welding including a metal stem, a head that includes a metal sleeve that screws over the forward end of the stem and that has alined openings at opposite sides through which a welding electrode is inserted transversely of the axis of the stem and in which the electrode is clamped by the end of the stem, an insulating sleeve covering the metal sleeve and having openings in register with the openings in the metal sleeve and extending for some distance beyond the rearward end of the metal sleeve, threads on the forward end of the stem over a substantially longer length of the stem than necessary for screwing the stem into its electrode clamping position in the head, an insulated lead cable with a bare end extending into a socket in the rearward end of the stem and permanently secured in said socket, a coil spring surrounding the insulated lead cable at a region back from the rearward end of the stem, an insulation jacket molded over the forward end portion of the spring, the cable between the spring and stem, and over the stem except for a few threads that screw into the head, said insulation extending into the rearward end of the insulating sleeve of the head and said insulation being of such a nature that it can be peeled off to expose new threads if the end of the stem becomes damaged and has to be cut off.

VALMORE FORGETT.